Dec. 27, 1966  D. J. DAVIS  3,294,890
METHOD OF MOLDING PLASTIC MATERIAL TO A DEFORMABLE ARTICLE
Original Filed June 1, 1962  2 Sheets-Sheet 1
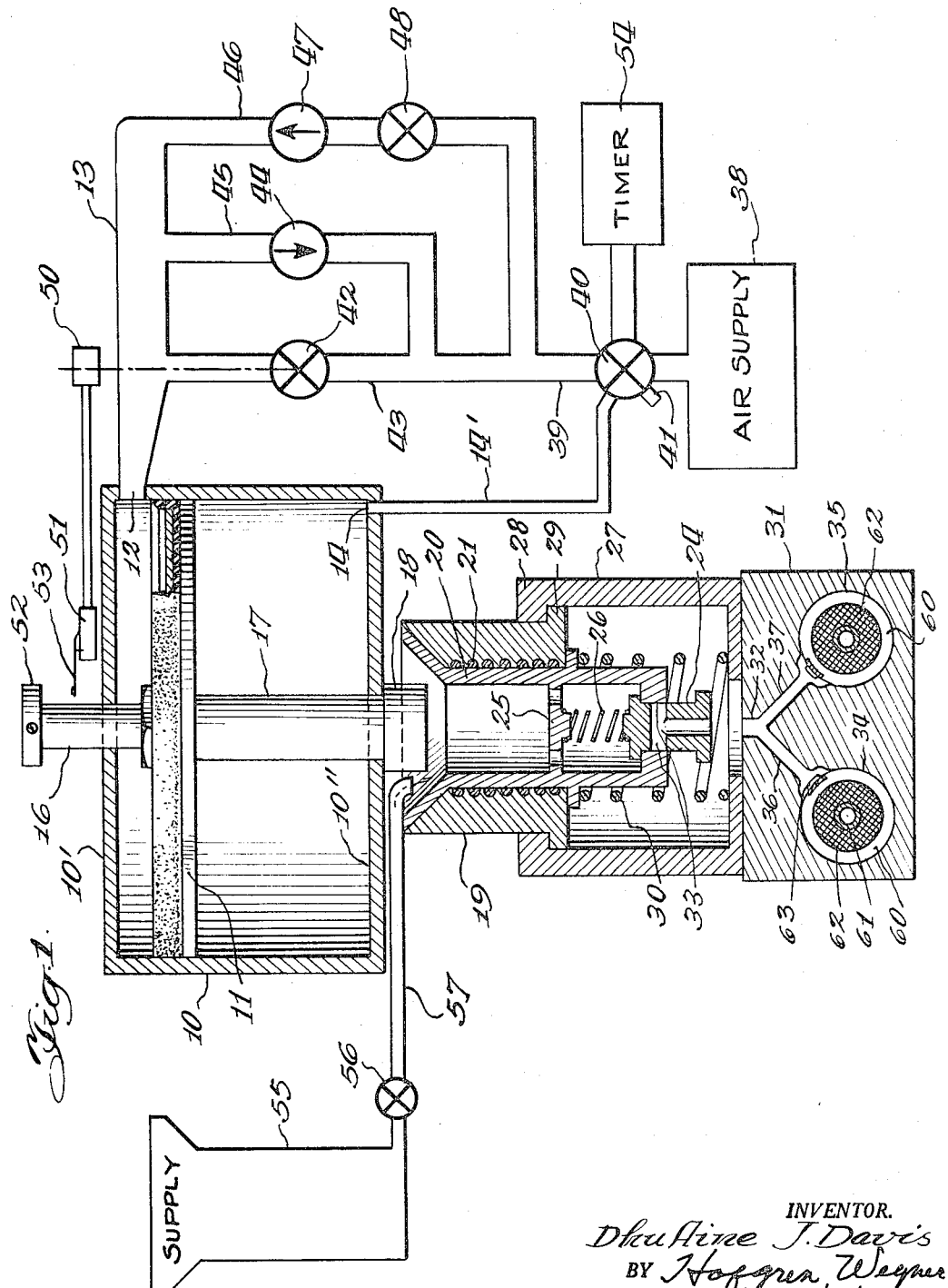
INVENTOR.
Dhuaine J. Davis
BY Hofgren, Wegner,
Allen, Stellman & McCord
Attorneys

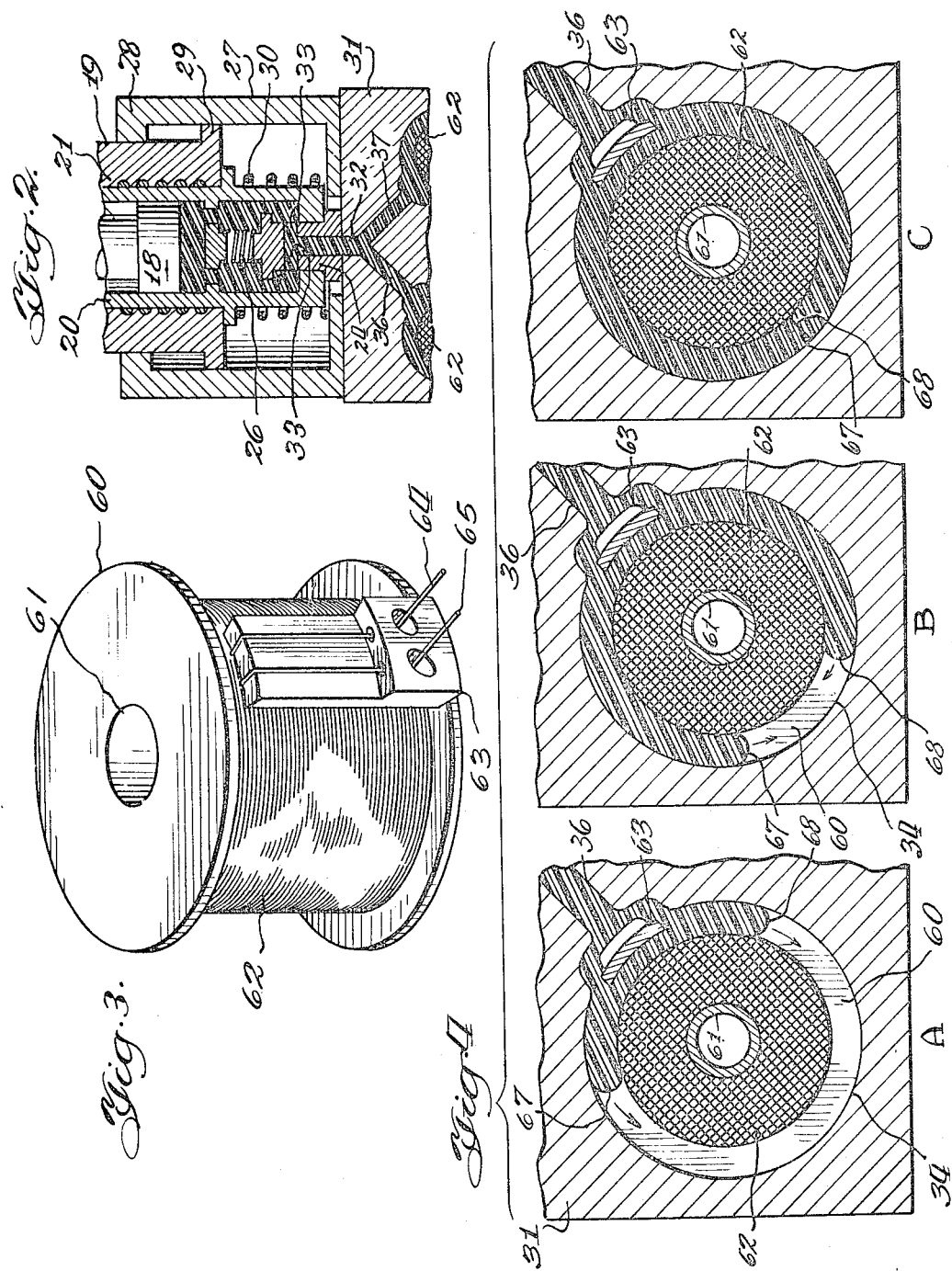

United States Patent Office 3,294,890
Patented Dec. 27, 1966

3,294,890
METHOD OF MOLDING PLASTIC MATERIAL TO A DEFORMABLE ARTICLE
DhuAine J. Davis, Wheaton, Ill., assignor to Hermetic Coil Co., Inc., Wheaton, Ill., a corporation of Connecticut
Original application June 1, 1962, Ser. No. 199,348, now Patent No. 3,200,444. Divided and this application Jan. 18, 1965, Ser. No. 426,301
6 Claims. (Cl. 264—272)

This application is a division of my application Serial No. 199,348, filed June 1, 1962, now Patent No. 3,200,444.

This invention relates to a molding method and more specifically to a slush-injection molding method for encapsulating deformable articles.

There are generally two types of apparatus used to form a plastic material about an article to be encapsulated. One, the injection type, provides a means for forcing material in a fluid state under pressure into a mold in which the article to be encapsulated is held. In this type of apparatus considerable pressure is exerted upon the article and oftentimes damage results or tolerances on the article are not held.

The other type of encapsulating apparatus is the slush-type molding process in which the article to be covered with plastic is placed in a mold and material in a fluid state is poured into the mold until the article is completely covered. In this type of molding the seal between the plastic which is poured into the mold and the article to be encapsulated is often times faulty, and thus subjects the article to the effects of humidity, vibration and leakage.

It is an object of this invention to provide a molding method which combines the injection and slush molding processes.

It is a further object of this invention to provide a method for encapsulating deformable articles without subjecting the articles to mechanical strains.

It is another object of this invention to provide a method for molding a humidity and liquid seal about a deformable member without affecting the tolerances and dimensions of the deformable member.

It is a feature of this invention that the method for molding a material to a deformable article comprises the steps of placing a deformable article in a mold, admitting material in a plastic state into the mold at a first pressure and admitting further material in a plastic state into the mold at a reduced pressure for completing the molding of the material to the deformable article.

Another feature of the invention is that material is admitted into the mold to fill substantially eighty to ninety percent of the mold not occupied by the article, under a first pressure, and that the molding of the material to the deformable article is completed under a decreased pressure and a knit line is formed under a positive pressure.

Other features and advantages will become apparent from the following detailed description taken in connection with the accompanying drawings, in which:

FIGURE 1 is a schematic drawing, partially in cross section, of an embodiment of the invention;

FIGURE 2 is a cross sectional view of the valve of FIGURE 1;

FIGURE 3 is a drawing of a deformable article; and

FIGURE 4 is a cross sectional view of a deformable article in a mold and shows three phases of the encapsulation of the article.

Referring now to FIGURES 1 and 2, there is provided a cylinder 10 having end walls 10', 10'' and a piston 11 actuable by air pressure received through a port 12 from a manifold 13 and returned to the upper position by air admitted through a port 14. A pair of shafts 16, 17 connected to piston 11, extend through the end walls 10' and 10'' respectively of the cylinder 10. Coupled to the end of shaft 17 is a ram 18 adapted to be forced into a heating chamber 19.

The heating chamber 19 consists of an inner cylindrical member 20, a heating element 21 and a surrounding layer of insulating material 22. The upper end of member 20 is formed in a conical shape for receiving granules of plastic material and the lower end has an aperture 23 holding a valve member 24. A plate 25 is held in member 20 and a spring 26 under compression between plate 25 and valve 24 keeps the valve closed except during portions of the operating cycle.

A frame member 27 has an inwardly projecting upper end 28 which engages a projection 29 on the heating chamber 19 when the heating chamber is in its uppermost position under the urging of a spring 30.

A mold 31 is held against the lower end of frame member 27 with a port 32 axially aligned to engage a passage 33 in valve 24. A pair of molding chambers 34 and 35 are shown joined to port 32 by a pair of connecting passageways 36 and 37.

An air supply 38 is coupled to a feed line 39 having an air valve 40 therein which includes a venting port 41 and to feed line 14'. A two-way solenoid actuated valve 42 connected in a line 43 joined to air line 39 connects to manifold 13 and provides air to actuate piston 11 through port 12. A check valve 44 is connected in a line 45 bypassing the pressure valve 42 and evacuates air from port 12 through vent 41 when valve 40 is in the exhaust position. Additionally, there is provided a safety line 46 including a check valve 47 and a pressure regulator or reducer 48 coupled between manifold 13 and air line 39. Pressure valve 42 is shown connected by a dashed line 49 to a solenoid 50 which is electrically connected to a microswitch 51. A collar 52 adjustably held on shaft 16 actuates microswitch 51 upon downward movement of the piston when it engages contact arm 53 and solenoid 50 is actuated to shut off the air pressure valve.

A timer 54 shown coupled to air valve 22 performs the operation of cycling the molding apparatus.

A supply hopper 55 of molding material is provided for charging the heating chamber through a feed valve 56 and feed pipe 57 disposed above the conical end of heating chamber 19. Normally, the material is maintained in the hopper in granulated form and after it is fed to the chamber 20 application of heat and high pressure changes these granules into a plastic state usable in the mold to encapsulate the articles. The high pressure further acts to flow the plastic material rapidly into the mold and prevents "setting" within the passageways. However, it is desirable to prevent the high pressure from being transmitted to the deformable article through the plastic material, and this is accomplished by reducing the pressure during the last portion of the encapsulation. Thus, there is provided a high speed molding apparatus which does not damage or deform articles encased in plastic.

The operation of the molding apparatus is as follows. Timer 54 actuates feed valve 56 and the heating chamber 19 is charged with granulated plastic material, as nylon, from supply hopper 55. Then the pressure valve 40 is actuated supplying air under pressure to the upper portion of cylinder 10 and acting against piston 11 forcing it in a downward direction. Heating element 21 in conjunction with the applied pressure changes the granulated material to a plastic state and ram 18 enters the member 20 forcing out trapped air and reducing the granule size so that the nylon is properly reduced to the plastic state.

As ram 18 moves downwardly in the cylindrical portion of the member 20, the force of spring 30 is overcome and the entire heating chamber 19 moves axially in a downward direction. When the face of valve 24 engages mold 31, valve 24 moves in a relatively upward direction with respect to the descending heating chamber 19. The aperture 33 rises above the lower lip of the member 20, and plastic material is forced through the aperture 33, the port 32 and connecting apertures 36, 37 into the molding chambers 34, 35. The ram continues to descend until a substantial portion, as eighty to ninety percent, of the plastic material needed has been admitted into the chambers 34, 35. At this time collar 52 engages contact arm 53 of switch 51 and actuates solenoid 50 to close the pressure valve 42.

As there is still air under pressure in the upper portion of cylinder 10 the piston continues to descend under the urging of the expanding air, the pressure of which continuously reduces. An additional amount of heated plastic material is forced into molding chambers 34, 35 under the urging of ram 18 and completely seals the article being encapsulated.

Timer 54 then actuates the air valve 40 venting line 39 to atmospheric pressure and check valve 44 opens releasing the remaining air under pressure confined in the upper portion of cylinder 10. Air is admitted through port 14 forcing the piston 11 upward and withdraws the ram from the cylindrical portion of member 20. Spring 30 expands forcing the heating chamber in the upward direction until stopped by the mating of members 28, 29. Valve 24 is forced downward by spring 26 and the apertures 33 are sealed with respect to the chamber 20.

In the event that the air pressure above the piston 11 drops below a predetermined amount during the injection of the material, check valve 47 is actuated and pressure reducer 48 allows air pressure into the piston at a predetermined low pressure and completion of a cycle of operation is insured.

FIGURE 3 shows one form of a deformable article, in this case a coil wound upon a bobbin which may be encapsulated using the method and apparatus of this disclosure. It includes bobbin 60 having a center shaft 61 about which is wound a coil of wire 62. A connector plate 63 is provided with a pair of leads 64, 65 which are brought up and over the top of connector plate 63 and fastened to the leads of coils 62. Bobbin 60, shaft 61 and connector plate 63 are formed of a plastic material.

FIGURE 4, having three views A, B and C, shows sections of mold 31 during successive steps of the encapsulation. The views are sections of the molding chamber 34 shown in FIGURE 1 taken substantially along a plane half way between the top and the bottom of the mold. In each of the three views the coil of FIGURE 2 is shown in the chamber and includes shaft 61, bobbin 60 and coil 62. The mold serves to hold the connector plate 63 in proper alignment with the bobbin. It is to be noted that the connections between the leads 64, 65 and the coil 62 are made prior to insertion in the mold.

In FIGURE 4A nylon 66 is shown flowing in a plastic state into the mold through channel 36. The leading edges 67 and 68 of the plastic material are shown and about ⅓ of the open space within the mold has been filled with plastic.

FIGURE 4B shows the leading edges 67, 68 of the plastic material positioned in the mold filling approximately eighty to ninety percent of the open volume within the mold. The connector plate 63 is completely surrounded by the plastic material and at this time the microswitch 51 shown in FIGURE 1 is actuated to shut the pressure valve 42.

FIGURE 4C shows the two leading edges 67 and 68 of the nylon uniting to form a knit line in the plastic material, and at this time the entire cavity of the mold around the coil is filled with material. In the embodiment of the invention shown a slight pressure is exerted within the mold as the result of the ram 18 continuing to descend under some pressure and a complete seal is formed along the knit line and the junctions of the plastic material with the bobbin and connector plate. At this time the timer 54 shown in FIGURE 1 is actuated and the ram is withdrawn from the heating chamber removing all pressure on the plastic material.

Although the embodiment has been discussed using air under pressure as the activating mechanism, it is to be understood that a hydraulic system could be used with proper changes being made in the pressure regulating valves.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. The method of molding a material to a deformable article comprising the steps of: placing a deformable article in a mold; admitting material in a plastic state, less than sufficient to fill the mold, into said mold at a first pressure, sufficient to damage said article; and, admitting further material in a plastic state, sufficient to fill the mold, into said mold at a continuously decreasing pressure.

2. The method of claim 1 wherein material is admitted under said first pressure to fill 80 to 90 percent of said mold not occupied by said article.

3. The method of claim 1 wherein said continuously decreasing pressure has a range from said first pressure to a minimum pressure greater than atmospheric pressure.

4. The method of claim 1 wherein said mold is completely filled and a knit line formed under a positive pressure.

5. The method of molding thermoplastic material to an article which comprises the steps of: placing the article to be molded in a mold; forcing thermoplastic material into said mold at a first pressure, sufficient to damage said article, to fill only a portion of the mold; and forcing additional thermoplastic material into said mold at a positive but continuously decreasing pressure less than said first pressure to fill said mold, said positive but continuously decreasing pressure falling to a pressure less than that at which damage would result to said article before the mold is completely filled.

6. The method of molding a sheath of thermoplastic material about an electrical coil wound on a bobbin having ends, comprising the steps of: placing the coil in a mold; sealing said mold against the ends of said bobbin; injecting thermoplastic material at a first pressure, sufficient to damage said coil into the annular space between said ends and the outer surface of said coil to flow around the coil, filling only a portion of said mold; forcing additional thermoplastic material into said mold at a positive but continuously decreasing pressure less than said first pressure, to fill the mold; and forming a knit line in the thermoplastic sheath surrounding said coil under positive pressure less than that which would damage said coil.

References Cited by the Examiner

UNITED STATES PATENTS

| 2,163,177 | 6/1939 | Novotny | 264—272 |
| 2,182,389 | 12/1939 | Reid | 264—279 |
| 2,671,247 | 3/1954 | Lester. | |

FOREIGN PATENTS

| 635,259 | 1/1962 | Canada. |

ROBERT F. WHITE, *Primary Examiner.*

F. MARLOWE, L. S. SQUIRES, *Assistant Examiners.*